June 16, 1959 B. J. CARR ET AL 2,891,155

PRECISION TIME-DELAY GENERATOR

Filed July 17, 1957

INVENTORS:

Barney J. Carr

Vernon D. Peckham

BY

Roland A. Anderson

Attorney

United States Patent Office 2,891,155

Patented June 16, 1959

2,891,155

PRECISION TIME-DELAY GENERATOR

Barney J. Carr and Vernon D. Peckham, Albuquerque, N. Mex., assignors, by mesne assignments, to the United States of America as represented by the United States Atomic Energy Commission Application July 17, 1957, Serial No. 672,527

2 Claims. (Cl. 250—27)

This invention relates to a time-delay generator circuit, and particularly to a precision time-delay generator which exhibits a low time-delay jitter.

Time-delay jitter, as referred to in electronic time-delay generators, is that variation in time-delay which exists as a result of variation in the generator characteristics and parameters. There are several instances in which the presence of time-delay jitter in time-delay generators produces undesirable results. In the generation of radar time markers, this jitter introduces range error. In delayed pulse circuits, it is accompanied by the generation of incorrectly timed signals. And it makes it impossible to interpret correctly the data obtained in connection with experiments in which time is a factor.

An object of this invention therefor is to provide a time-delay generator having low time-delay jitter.

A further object of this invention is to provide a means for generating a pulse time delay with repeatable precision.

In some time-delay generator circuits, "time jitter" is introduced in the output pulses, especially in those circuits employing gas or vacuum-type tube delay circuits. This time jitter causes unsatisfactory operation when the functioning of auxiliary circuits depends on these output pulses.

A further object of this invention is to provide a time-delay circuit whose accuracy is dependent only on a series resonant circuit.

The time-delay circuit employs a first and second thyratron in which the first thyratron accepts a pulse to be delayed. An inductor and capacitor are connected in series between the anode and cathode of the first thyratron, and a diode is connected in parallel with the inductor and capacitor. The output of the first thyratron is resistance-capacitance coupled to the input of the second thyratron. A capacitor and pulse transformer are connected in series between the anode and cathode of the second thyratron. A trigger pulse applied to the input of the first thyratron discharges the capacitor through the parallel diode and triggers the second thyratron after a time delay equal to $2\pi\sqrt{LC}$ seconds.

Figure 1:
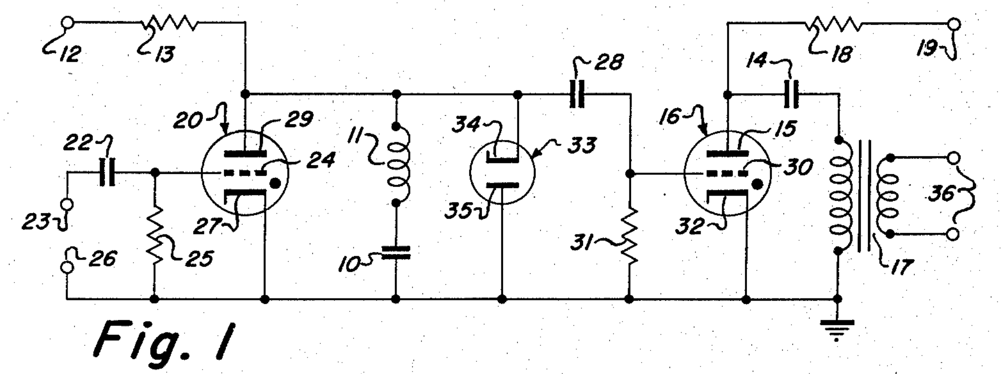
Figure 2:
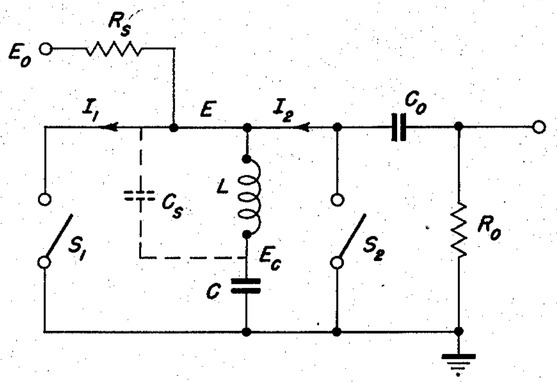
Figure 3:
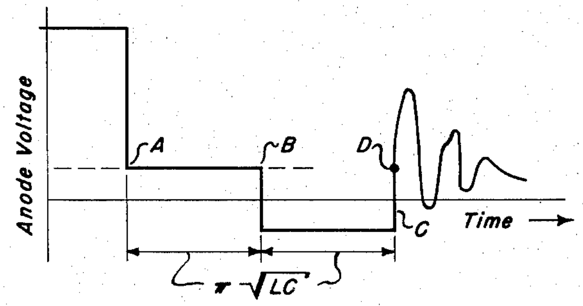
Figure 4:
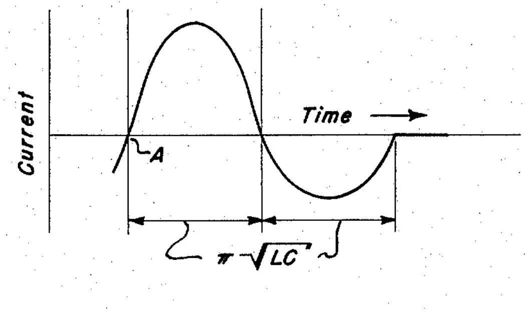

The features of the invention which are believed to be novel are set forth with particularity in the appended claims. The invention itself, however, both as to its organization and method of operation, can best be understood by reference to the following description taken in conjunction with the accompanying drawings, in which Figure 1 is a schematic circuit diagram of the preferred embodiment of the invention;

Figure 2 is a schematic circuit diagram illustrating the theoretical equivalent of the circuit of Figure 1; and Figures 3 and 4 are curves illustrating the operation of the circuit of Figure 1.

In the system of Figure 1, the invention is employed to produce a precise time delay of a trigger pulse. The accuracy of the time delay is dependent only on the serially connected capacitor 10 and inductor 11. Capacitor 10 is charged to the direct current potential applied at terminal 12 through anode resister 13 and inductor 11, while capacitor 14, connected between anode 15 of thyratron tube 16 and the primary winding of transformer 17, is charged to a direct current potential applied at terminal 19 through anode resistor 18.

The input circuit of thyratron tube 20 is a conventional resistance-capacitance network with capacitor 22 connected between input terminal 23 and control grid 24 of thyratron tube 20. Grid resistor 25 is connected between control grid 24 and ground or input terminal 26. Cathode 27 of tube 20 is connected directly to ground. The coupling between thyratron tubes 20 and 16 is a resistance-capacitance network with capacitance 28 connected between anode 29 of tube 20 and control grid 30 of tube 16, while grid resistance 31 is connected between the control grid 30 and ground. There is no provision for negative bias on thyratron tubes 16 and 20 because the invention employs thyratrons which do not require separate grid bias. Some thyratron tubes, however, require a small amount of grid bias to them in the nonconducting state prior to triggering. The use of such tubes would necessitate an obvious alteration of the circuit. Cathode 32 of tube 16 is connected directly to ground. Diode 33 has its cathode 34 connected to anode 29 of tube 20 and its anode 35 connected to ground. It should be noted that diode 33 is also connected in parallel with the series resonant circuit.

In operation, tubes 16 and 20 are initially nonconducting. A positive pulse is applied to input terminal 23 and, in turn, to control grid 24 of tube 20 through capacitor 22, triggering tube 20 and discharging capacitor 10, having a period of $T=2\pi\sqrt{LC}$ seconds through the tube for a time $t_1=\pi\sqrt{LC}$ seconds. This is true, since the time delay, as stated before, is dependent only on the serially connected inductance (L) and capacitance (C). When this happens, diode tube 33 conducts and tube 20 is extinguished. Current flows through diode 33 for a time $t_2=\pi\sqrt{LC}$ seconds. Current then ceases to flow through the diode and inductor 11 is shock-excited at a frequency dependent upon the self-resonant frequency of inductor 11. The voltage pulse across inductor 11 triggers tube 16 which discharges capacitor 14 through pulse transformer 17 at the end of the desired delay. The resultant pulse appearing at output terminal 36 connected to the secondary of transformer 17 can be used to energize apparatus connected thereto at a precise time interval after the initiating pulse.

Figure 2 shows a theoretical equivalent circuit of the circuit described in Figure 1. In the diagram, electrical letter nomenclature is employed. Where numbers are used in the description, they refer to the components of Figure 1.

Input thyratron 20 and the diode 33 may be represented by switches $S_1$ and $S_2$ respectively. The thyratron grid and plate resistance may be neglected in a simple analysis since they exert only small damping and are not important in the basic timing. $C_o$ and $R_o$, shown serially connected between the top end of switch $S_2$ and ground, couple signal E, shown at the top end of inductance L, to output thyratron 16 at the appropriate voltage level. Output thyratron 16 is not shown in the theoretical equivalent circuit.

In operation, switches $S_1$ and $S_2$ are initially open. Voltage E and voltage $E_c$, shown at the mid point between inductance L and capacitor C, are equivalent in value to the supply voltage, $E_o$, applied at terminal 12 in Figure 1. At this time there is no current flow.

The initiating trigger pulse closes switch $S_1$, and signal voltage E drops to a small voltage. Capacitor $C_s$, shown in dotted lines connected across the inductance L, is the equivalent shunt capacitance of the inductance. This $C_s$ is much smaller than C and is effectively in parallel with C after quick charging when $S_1$ closes. Serially connected inductance L and capacitance C, jointly connected in parallel across switch $S_1$, become a resonant circuit with a period of $2\pi\sqrt{LC}$ seconds. Capacitor C discharges through the inductor L. Current through $S_1$, $I_1$ increases until $E_c=0$ and then $I_1$ beings to decrease. $E_c$ increases in the negative direction until approximately equal to $-E_o$, at which time, one-half period of the resonant circuit, $I_1$ decreases to zero. At this time, switch $S_1$ opens and switch $S_2$ closes. Current $I_2$ builds up until $E_c=0$ and then decreases. $E_c$ increases positively until approximately equal to $E_o$, at which time the end of the second half-period of the resonant circuit, current $I_2$, becomes zero and switch $S_2$ opens. When either switch is closed, E is held at zero volts and $E_c$ varies. This circuit operation can be illustrated by the following equations in which:

When $S_1$ is closed, $$E=0$$

$$E_c=E_o \cos \frac{t}{\sqrt{LC}}$$

As $S_1$ opens and $S_2$ closes, the same formulas apply except for the time interval. When $S_2$ closes, C has no charging path. Thus $E_c$ remains at $E_o$, its final value, and $$E=E_o\left(1-\cos \frac{t}{\sqrt{LC}}\right)$$

This voltage rises to trigger the output thyratron.

Heretofore, the effect of small shunt capacitance $C_s$ of inductance L has been neglected as insignificant. When both switches are open, no charging path exists for capacitor C. The voltage across $C_s$ is applied across the inductance L. E is very small, and $E_c$ is approximately equal to $E_o$. The series resonant circuit of inductance L and capacitance $C_s$ operates to swing E about $E_c$ with a short period of $2\pi\sqrt{LC_s}$ seconds. Voltage E rises rapidly from about zero toward $2E_o$, and this rapid rise is coupled through $C_o$ to trigger output thyratron 16.

Referring to Figure 3, there is shown a curve to illustrate the anode voltage of tube 20, where the voltage is the ordinate and time is the abscissa. The time of the positive input pulse is shown at point A. The distance from A to B represents the time during which capacitor 10 discharges through tube 20, which is equal to $t_1=\pi\sqrt{LC}$ seconds. The distance from point B to point C represents the time during which diode 33 conducts, tube 20 is extinguished, and current flows through diode 33 for time $t_2=\pi\sqrt{LC}$ seconds. At point D tube 16 fires, ending the time delay of the circuit. The dotted line shown on the curve is the ionization potential of the gas triode.

Referring to Figure 4, there is shown a current-versus-time curve of the anode current of tubes 20 and 33. The current cycle starts with the positive input pulse at point A. The positive half-cycle is the anode current of tube 20, while the negative half-cycle is the anode current of tube 33.

The time duration of the complete cycle is the same as shown in Figure 3, namely, the sum of $t_1=\pi\sqrt{LC}$ seconds for tube 20, and $t_2=\pi\sqrt{LC}$ seconds for tube 33.

What has been described is a preferred embodiment of the invention. Those skilled in the art will recognize that certain changes may be made to the embodiment without departing from the sphere and scope of the invention as claimed below.

What is claimed is:

1. A precision time-delay circuit comprising a first and a second thyratron, a series resonant circuit including an inductance and capacitance connected in parallel with the first thyratron, means for applying a direct-current potential to the resonant circuit for charging the capacitor, a diode having a finite back resistance connected in parallel with the resonant circuit, the second thyratron connected to and responsive to the diode, means for triggering the first thyratron at the beginning of a time-delay, and means responsive thereto for discharging the capacitor through the first thyratron and through the diode in the order named, thereby triggering the second thyratron $2\pi=\sqrt{LC}$ seconds after the triggering of the first thyratron.

2. A precision time-delay circuit comprising a source of direct current, a first thyratron having at least an anode, a cathode and a control grid, the anode being connected to the source of direct current and the cathode being connected to ground, an input circuit connected to the control grid for accepting a pulse to be delayed, a series resonant circuit including an inductance and capacitance connected between the anode and cathode of the first thyratron and to the direct-current source, thus charging the capacitor, a diode having a finite back resistance connected in parallel with the resonant circuit, the anode of the diode being connected to ground, a second thyratron having at least an anode, a cathode, and a control grid, the anode being connected to the source of direct current and the cathode being connected to ground, an output circuit connected between the anode and cathode of the second thyratron, circuit means for connecting the cathode of the diode to the control grid of the second thyratron, means for triggering the first thyratron at the beginning of a time delay, and means responsive thereto for discharging the capacitor through the first thyratron and through the diode in the order named, thereby triggering the second thyratron $2\pi\sqrt{LC}$ seconds after the triggering of the first thyratron.

References Cited in the file of this patent

UNITED STATES PATENTS

| | | |
|---|---|---|
| 2,411,898 | Schelleng | Dec. 3, 1946 |
| 2,436,395 | Manley et al. | Feb. 24, 1948 |
| 2,484,763 | Sturm | Oct. 11, 1949 |